United States Patent [19]
Michel

[11] Patent Number: 5,559,599
[45] Date of Patent: Sep. 24, 1996

[54] GRADUATION SCALE HAVING A CONTINUOUS PLANAR SURFACE WITH A PROTECTIVE DIFFUSION BARRIER LAYER THEREON

[75] Inventor: Dieter Michel, Traunstein, Germany

[73] Assignee: Dr. Johannes Heidenhain GmbH, Traunreut, Germany

[21] Appl. No.: 339,120

[22] Filed: Nov. 14, 1994

[30] Foreign Application Priority Data

Nov. 12, 1993 [DE] Germany .......................... 43 38 680.6

[51] Int. Cl.$^6$ ..................................................... G01B 9/02
[52] U.S. Cl. ......................................................... 356/356
[58] Field of Search ................................ 356/356, 237 G

[56] References Cited

U.S. PATENT DOCUMENTS

| | | | |
|---|---|---|---|
| 4,776,701 | 10/1988 | Pettigrew | 356/356 |
| 4,795,236 | 1/1989 | Ise | 350/162.2 |
| 4,991,937 | 2/1991 | Urino . | |
| 5,119,231 | 6/1992 | Nelson et al. . | |
| 5,126,560 | 6/1992 | Kraus | 250/231.13 |

FOREIGN PATENT DOCUMENTS

| | | |
|---|---|---|
| 0186166 | 7/1986 | European Pat. Off. . |
| 0211120 | 2/1987 | European Pat. Off. . |
| 3518774C2 | 11/1986 | Germany . |
| 2168215 | 6/1986 | United Kingdom . |

OTHER PUBLICATIONS

Willhelm, Jörg. "Photoelektrische Aufnehmer Zur Messung von Lageänderungen." Diss. U. of Hannover, 1978, p. 19.

Poner, T. et al., "Transmission Phase Gratings By Ion–Exchange In Optical Glasses," Gradient–Index Optical Systems—Summaries of Papers Presented at the Tenth Topical Meeting on Gradient–Index Optical Systems, pp. 76–9, Oct. 4–6, 1992.

*Primary Examiner*—Samuel A. Turner
*Assistant Examiner*—Amanda Merlino
*Attorney, Agent, or Firm*—Brinks Hofer Gilson & Lione

[57] ABSTRACT

A measuring instrument having at least one phase transmission graduation formed on a carrier member in which the graduation is formed by grating structures in a graduation region of the carrier member, the graduation region of the carrier member having a continuous planar surface.

23 Claims, 2 Drawing Sheets

GRADUATION SCALE HAVING A CONTINUOUS PLANAR SURFACE WITH A PROTECTIVE DIFFUSION BARRIER LAYER THEREON

FIELD OF THE INVENTION

The present invention relates to a length or angle measuring device of the photoelectric type having at least two members movable with respect to one another wherein each member is provided with a graduation grating and, in particular, a graduation grating in the form of a phase grating having a continuous plane surface that can be easily cleaned.

BACKGROUND OF THE INVENTION

The demands for positional accuracy of precision machining tools have become more stringent in recent years. This has led to an increased demand for position measuring instruments, whether they be length or angle measurement devices having resolutions in the submicrometer range. Measuring instruments that operate interferentially, known as grating interferometers, have been used.

In general, such machines provide a measurement value by interfering at least two beams of light diffracted at a scale graduation and evaluating the phase difference. Equation (1) below defines the phase displacement $\Omega$ of a wave of the order n diffracted at a scale grating for a displacement x of the scale having a graduation period c:

$$\Omega = (n * 2\pi * x)/c \qquad (1),$$

where

* denotes the operation of multiplication. From equation (1) it can be seen that the wavelength of the light source has no affect on the phase displacement. Thus the measurement signal is derived solely from the graduation of the scale grating and is thus only as accurate as the graduation.

The scale gratings with phase graduations used in interferometers have been produced by the processes of lithography or holography. An advantage of lithographically produced scale gratings is that gradations with lengths of over 1 meter can be produced, while in holographically produced scale gratings because of the high demands made on the imaging optics, the length is limited to less than 250 mm.

Such gratings have profiled phase gratings on their surface and thus are intrinsically vulnerable to becoming soiled especially when such measuring instruments are used in dirty environments, such a machine tooling. An example of such a grating is found in U.S. Pat. No. 4,776,701 (Petrigrew) herein incorporated by reference.

SUMMARY OF THE INVENTION

An object of the present invention is to provide a phase grating graduation for a length or angle measurement device that is not vulnerable to soiling and thus provides a measuring device that is better secured against malfunction that may be attributed to such soiling and is more versatile in use. This is accomplished by providing a phase transmission grating on a graduation carrier member, the phase grating having different transmission properties from the graduation carrier member wherein the graduation carrier member and the phase grating form a continuous plane surface in the graduation region. This allows the graduation region of the phase grating to be easily cleaned. More particularly, the transmission phase grating has a continuous plane surface in the graduation region of a graduation carrier such that the graduation structures are spaced apart from one another, the structures having a transmission property different form that of the graduation carrier and are an integrated component of the graduation carrier material.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
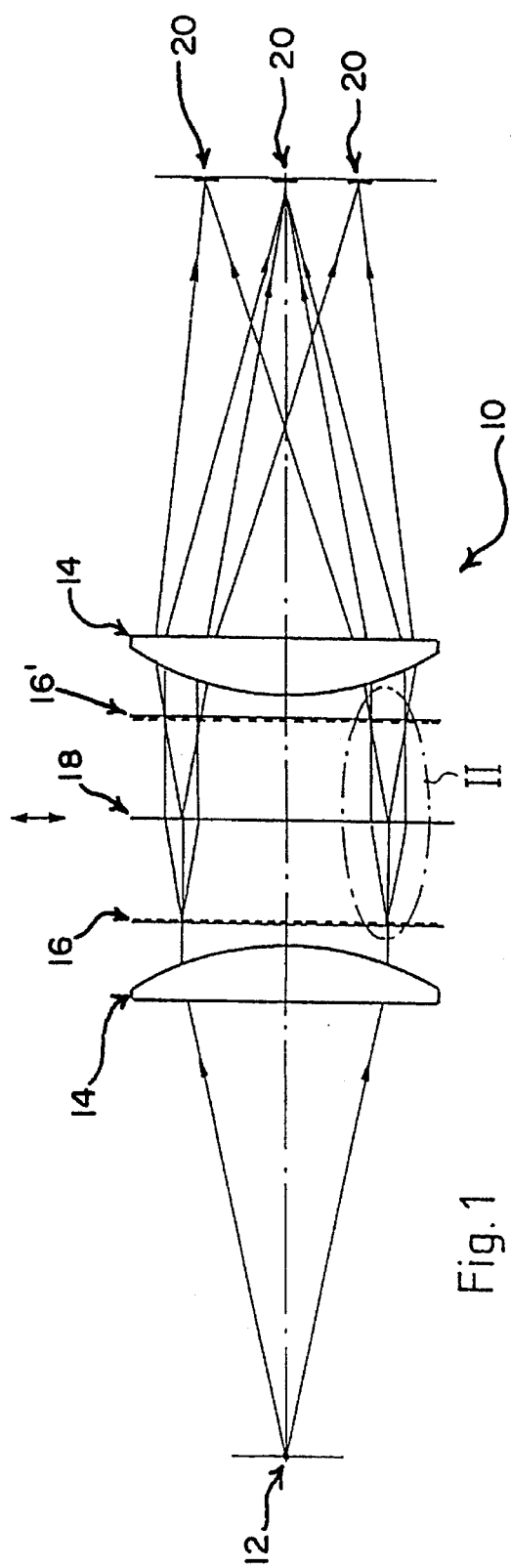
FIG. 1 illustrates a schematic of an interferometric measuring device according to a preferred embodiment of the present invention.

FIG. 1 illustrates a simplified schematic of an interferometric measuring device 10 according to a preferred embodiment of the present invention. The measuring device includes a light source 12, two condensers 14, scanning grids 16 and 16', a scale grating 18 and a plurality of detectors 20, preferably photodetectors. The scanning grids 16 and 16' and the scale grating 18 are movable with respect to one another. In a preferred embodiment, the scanning gratings 16 and 16' are mounted on a first member (not shown) and the scale grating 18 is mounted on a second member (not shown) movable with respect to the first member as indicated by the arrow in FIG. 1. In addition, while scanning gratings 16 and 16' are illustrated as two physically separate gratings, they may in actuality be one grating. In such a case, the scale grating 18 would be reflective. In any case, FIG. 1 represents a developed beam path through the grating structures of the measuring device. In a preferred embodiment, as shown in FIG. 1, the scanning gratings 16 and 16' are physically separate and the scale grating 18 is a transmission type phase grating as will be described in detail hereinafter.

The light source 12 emits a flat wave or beam of light which, after passing through the condenser lens 14, impinges the scanning grating 16 perpendicularly (i.e., normal to the plane of the grating). Preferably, the light source 12 is an infrared radiator. The measurement device 10 shown in FIG. 1 operates on the principle that the partial beams diffracted at a moving scale grating 18 are modulated in the phase of the light frequency by the movement of the grating 18. In other words, while the scale grating 18 is displaced by one grating period, the phase of the two diffracted first order partial beams each travels through 360°. The phases of the positive and negative first order beams move contrary to one another. If the two first order beams are made to interfere again, this creates a modulated light beam with twice the displacement frequency. This is true for both amplitude and phase gratings, however, phase gratings can be dimensioned such that the 0th order beam is extinguished thereby providing a greater proportion of the incident energy in the two first orders of diffraction.

Figure 2:
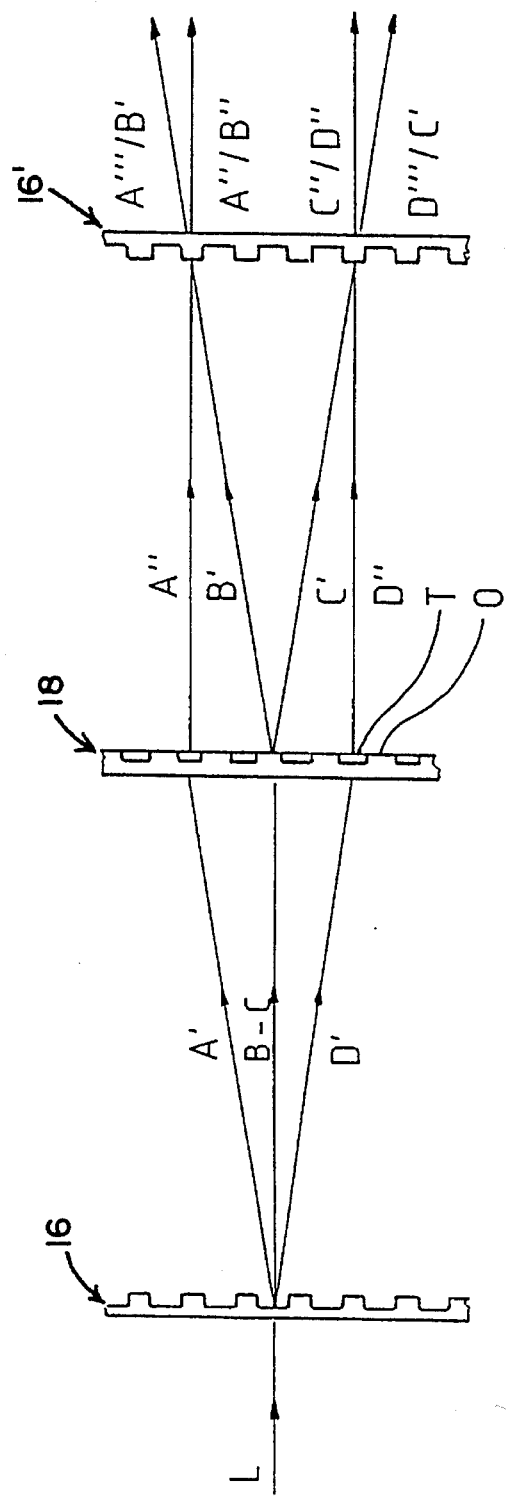
FIG. 2 is a detailed schematic of a portion of the device shown in FIG. 1.

FIG. 2 is a detailed schematic of a portion of the device shown in FIG. 1. The beam of light emitted form the light source 12 strikes scanning grating 16 where it is partially diffracted and partially admitted. The resultant partial beams A', B–C and D' are diffracted at the scale grating 18. The resultant partial beams A", B', C' and D" are brought into interference at the scanning grating 16'. The resultant partial beams A'"/B', A"/B" C"/D" and D'"/C' are focused onto the detectors 20 by condenser lens 14. When the scale grating 18 moves, the three photodetectors each generate signals phase-displaced by one-third the signal period (i.e., a signal period=half of a scale grating period). The phase displacement is determined by the structure of the scanning grids 16 and 16' (i.e. width and depth) as described in previously referred to U.S. Pat. No. 4,776,701.

The cooperation of the components shown in FIG. 2 will now be described. The incident wave of light on passing through scanning grating 16 is essentially diffracted in three directions, in particular, the 0th order and ±1 order beams. The scanning grating 16 is embodied such that the beams of the 0th order are delayed in phase by an amount φ compared to the beams of the first order. When the beams arrive at the scale grating 18 they are diffracted in the two directions of the ±1 order. The scale grating 18 is embodied such that no zero order diffraction occurs.

Upon displacement of the scale grating 18 relative to the scanning gratings 16 and 16', the beams of the positive first order diffracted at the scale grating 18 undergo a phase change by the amount Ω proportional to the displacement x, and those of the negative first order undergo a similar but opposite phase change–Ω as described by equation (2) below:

$$\Omega = (2\pi^* x)/c \qquad (2),$$

see equation (1) where n=1.

Upon passage through the scanning grating 16' diffraction and phase displacement again occur. Waves of the same optical path length and the same direction come to interfere with one another in the scanning grating 16'. The phases of the interfering partial waves result from the sum of the phase changes that the individual partial beams undergo as they pass through the gratings. If the measurement device is used with a nonmonochromatic and spatially incoherent light source, then only the interfering waves pointing in the 0 and ±1 directions contribute to recovering a signal. At the output of the grating system a wave of phase–Ω and a wave of phase 2φ+Ω interfere in the direction marked +1 and a wave of phase Ω and a wave of phase 2φ+Ω interfere in the direction marked –1.

Figure 3:
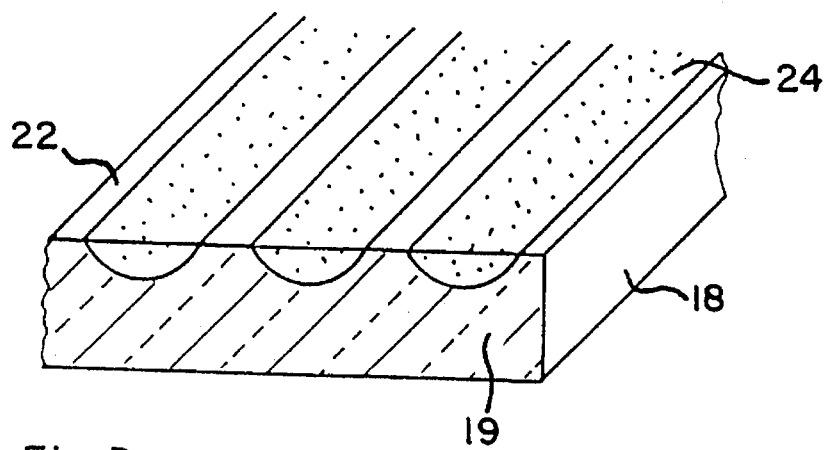
FIG. 3 is a perspective view of a phase grating according to a preferred embodiment of the present invention.

FIG. 3 is a perspective view of a phase grating according to a preferred embodiment of the present invention. The scale grating 18 includes a carrier member 19 and preferably is in the form of transmission type phase grating having a planar surface 22. In the graduation region shown at planar surface 22, the graduation has graduation structures 24 which have transmission properties different from that of the carrier member 19. In contrast to the length or angle measurement instruments that are equipped with profiled phase gratings, sometimes referred to as step type gratings, the planar surface 22 of the gratings according to the present invention is simple to clean or keep clean with the use of strippers. In addition, scanning gratings 16 and 16' are also preferably phase gratings having continuously planar surfaces.

In addition, the measurement instruments using such gratings are often exposed to temperature variants that require the gratings to have a certain coefficient of thermal expansion. This often dictates the material composition of the carrier member 19, for example silicate glass. These materials must often be protected against environmental factors by either barrier layers or lined with other functional layers. Such layers, however, improperly alter the optical properties in theses conventional step-type grating structures because they are thick in proportion to the step height of the grating.

Figure 4:
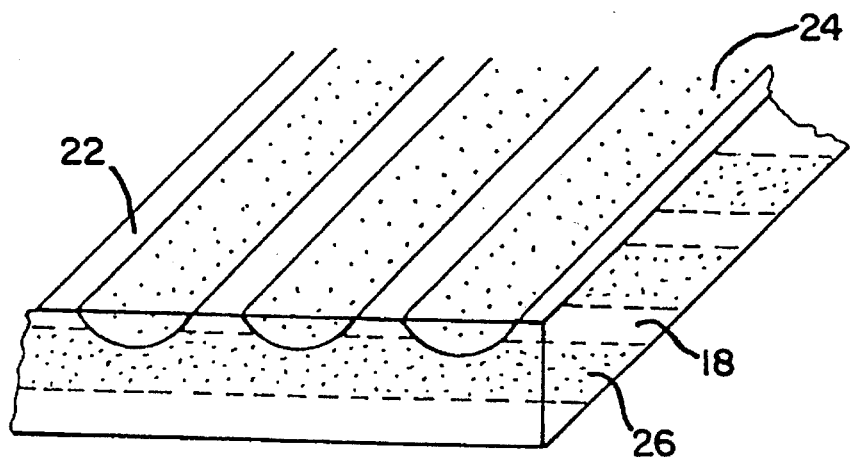
FIG. 4 is a perspective view of a phase grating according to a second preferred embodiment of the present invention.

In the gratings according to the present invention, thick protective layers can be applied without affecting the optical properties of the grating. Examples of such protective or functional layers include, optical filters (i.e. absorbing and dielectric interference filters); electrostatically shielding transparent layers; electrically conductive transparent layers (i.e. liquid crystal displays); diffusion barrier layers (i.e. for avoiding alkali ion diffusion); tribologic layers (with "emergency operation properties"); and hydrophilic/hydrophobic layers (to protect from soil or condensation), for example. Such layers may be applied by known immersion methods such as sol-gel method or OROCERE, or thin-film technologies (i.e. plasma polymerization, CVD, PVD, sputtering, etc.). It is especially advantageous that the reference parameters in terms of intensity and phase position of the diffracted partial beams relative to one another can be adjusted purposefully by adhering to certain production parameters. So-called superstructures of the kind shown in FIG. 4 are relatively simple to make while the planarity of the surface is preserved. Superstructures as shown in FIG. 4 include grating or division structures arranged one over another. A phase grid is included on each surface 22 and 26 of the grid 18. The lines of the phase grid on one surface 26 are perpendicular to the lines of the phase grid provided on the other surface 22 and thus cross each other.

Adjusting the diffraction parameters of the gratings can be done in production using the ion exchange method for instance by controlling the temperature of the salt melt, substrate composition and so forth as well as by controlling the height of the field reinforcement. A grating produced by this method for a television camera is discussed in U.S. Pat. No. 4,795,236 (Ise), herein incorporated by reference.

Figure 5:
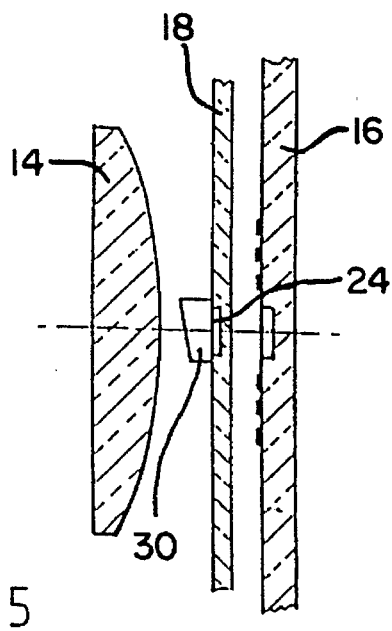
FIG. 5 illustrates a schematic of a portion of a measuring device according to another preferred embodiment of the present invention.

As sown in FIG. 5, the planarity of the phase structure is especially favorable if optical components such a prisms 30 have to be applied to the gradation such a scale grating 18.

The scale and scanning gratings of the present invention can be produced by the following methods, such as ion exchange, proton exchange, ion implantation, crystallization and orientation of molecules or molecule chains. A partial discolorization of the grating graduation 18 can occur in the area where the index of refraction occurs when using these methods.

Of course, it should be understood that a wide range of changes and modifications can be made tot he preferred embodiments described above. It is therefore intended that the foregoing detailed description be regarded as illustrative rather than limiting and that it be understood that it is the following claims, including all equivalents, which are intended to define the scope of this invention.

What is claimed is:

1. A length or angle measuring instrument comprising:
   a first grating graduation for diffracting a beam of light;
   a carrier member having a phase graduation thereon in a graduation region of the carrier member wherein the graduation has graduation structures spaced apart from one another in the graduation region, the graduation structures having transmission properties different from that of carrier member wherein the graduation is an integrated component of the carrier member and forms a continuous planar surface in the graduation region, wherein said continuous planar surface has a protective diffusion barrier layer thereon, the graduation of the carrier member further diffracts the beam of light passed through the first graduation;

a second grating graduation for bring the diffracted beams from the carrier member into interference; and detectors for detecting the interference.

2. A measuring instrument according to claim 1 wherein the first and second grating graduations are physically the same.

3. A measuring instrument according to claim 1 wherein the graduations structures have an index of refraction different for that of the carrier member.

4. A measuring instrument according to claim 3 wherein the index of refraction of the graduation structures is formed by physical processes.

5. A measuring instrument according to claim 3 wherein the index of refraction of the graduation structures is formed by chemical processes.

6. A measuring instrument according to claim 1 wherein the phase graduation is formed by ion exchange.

7. A measuring instrument according to claim 1 wherein the phase graduation is formed by ion implantation.

8. A measuring instrument according to claim 1 wherein the phase graduation is formed by proton exchange.

9. A measuring instrument according to claim 1 wherein the phase graduation is formed by the orientation of molecules.

10. A measuring instrument according to claim 1 further including a carrier member having a second graduation formed therein to create a superstructure grating.

11. A measuring instrument according to claim 1 wherein phase graduation is on a first surface of the carrier member further including a second phase graduation formed on a second surface of the carrier member.

12. A measuring instrument according to claim 11 wherein the first and second surfaces are parallel to each other.

13. A length or angle measuring instrument comprising:

a first grating graduation; and a carrier member having a phase graduation in a graduation region of the carrier member wherein the graduation has graduation structures spaced apart from one another in the graduation region, the graduation structures having transmission properties different from that of the carrier member wherein the graduation is an integrated component of the carrier member and forms a continuous planar surface in the graduation region wherein the continuous planar surface has a protective diffusion barrier layer thereon.

14. A measuring instrument according to claim 13 wherein the graduations structures have an index of refraction different from that of the carrier member.

15. A measuring instrument according to claim 14 wherein the index of refraction of the graduation structures is formed by physical processes.

16. A measuring instrument according to claim 14 wherein the index of refraction of the graduation structures is formed by chemical processes.

17. A measuring instrument according to claim 13 wherein the phase graduation is formed by ion exchange.

18. A measuring instrument according to claim 13 wherein the phase graduation is formed by ion implantation.

19. A measuring instrument according to claim 13 wherein the phase graduation is formed by proton exchange.

20. A measuring instrument according to claim 13 wherein the phase graduation is formed by the orientation of molecules.

21. A measuring instrument according to claim 14 further including a carrier member having a second graduation formed therein to create a superstructure grating.

22. A measuring instrument according to claim 13 wherein phase graduation is on a first surface of the carrier member further including a second phase graduation formed on a second surface of the carrier member.

23. A measuring instrument according to claim 22 wherein the first and second surfaces are parallel to each other.

* * * * *

UNITED STATES PATENT AND TRADEMARK OFFICE
CERTIFICATE OF CORRECTION

PATENT NO. : 5,559,599
DATED : September 24, 1996
INVENTOR(S) : Michel

It is certified that error appears in the above-indentified patent and that said Letters Patent is hereby corrected as shown below:

In Claim 1, line 9, delete "bring" and substitute therefor --bringing--.

In Claim 3, line 12, delete "for" and substitute therefor --from--.

Signed and Sealed this

Seventh Day of April, 1998

Attest:

BRUCE LEHMAN

*Attesting Officer*    *Commissioner of Patents and Trademarks*